United States Patent
Craggs

(10) Patent No.: US 7,493,598 B1
(45) Date of Patent: Feb. 17, 2009

(54) METHOD AND SYSTEM FOR VARIABLE TRACE ENTRY DECAY

(75) Inventor: Ian Gerald Craggs, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,533

(22) Filed: Jan. 26, 2008

(51) Int. Cl.
*G06F 9/44* (2006.01)

(52) U.S. Cl. .......................... 717/124; 717/128; 714/38

(58) Field of Classification Search ......... 717/124–131; 716/1, 18; 712/37, 227, 240; 703/22, 26, 703/27; 714/37, 38; 709/224; 707/100; 726/1, 22, 23
See application file for complete search history.

(56) References Cited

U.S. PATENT DOCUMENTS

| | | | |
|---|---|---|---|
| 6,182,243 B1 | 1/2001 | Berthe et al. | |
| 6,347,374 B1 * | 2/2002 | Drake et al. | 726/1 |
| 6,802,054 B2 | 10/2004 | Faraj | |
| 6,871,228 B2 * | 3/2005 | Shah et al. | 709/224 |
| 6,996,580 B2 * | 2/2006 | Bae et al. | 707/200 |
| 7,346,620 B2 * | 3/2008 | Grubbs et al. | 707/100 |
| 7,379,999 B1 * | 5/2008 | Zhou et al. | 709/224 |
| 7,398,429 B2 * | 7/2008 | Shaffer et al. | 714/45 |
| 2005/0149535 A1 * | 7/2005 | Frey et al. | 707/100 |
| 2006/0195731 A1 | 8/2006 | Patterson et al. | |
| 2006/0265625 A1 | 11/2006 | Dubois et al. | |
| 2007/0006154 A1 * | 1/2007 | Yang et al. | 717/124 |
| 2007/0016831 A1 | 1/2007 | Gehman et al. | |

OTHER PUBLICATIONS

"The z990 first error data capture concept", by S. Koerner et al.; IBM J. Res. & Dev. vol. 48 No. 3/4 May/Jul. 2004, pp. 557-567.

* cited by examiner

*Primary Examiner*—Lewis A. Bullock, Jr.
*Assistant Examiner*—Jue S Wang
(74) *Attorney, Agent, or Firm*—MaxValue IP, LLC

(57) ABSTRACT

History of software execution and the associated messages are stored in repositories and their associated buffers. Each level of trace entry is expired at a different, tailored rate. The most detailed log, showing only the information immediately preceding the event, expires most quickly. This means that when the trace buffer is written to some storage medium at the point of failure, the trace entries are more frequent and detailed. However, as time passes, more of the details are lost. Nevertheless, the outline history of events, that would have been lost in the case of a uniform details level of tracing, is maintained. Therefore, information with at least some degree of details will be available further back in time to help the diagnosis.

1 Claim, 3 Drawing Sheets

METHOD AND SYSTEM FOR VARIABLE TRACE ENTRY DECAY

BACKGROUND OF THE INVENTION

Software development usually consists of several phases, including but not limited to, conception of the idea, software design, coding, debugging and testing. After the idea is presented, software designed, and coding is finished, the program is run in a debugging environment to determine the possible errors associated with its execution. The error information can be generated by trace points located in several different sections of the software. When an error is found, the debugging software, or the person in charge of the debugging task, uses error data gathered from different sections of the software, to investigate what might be causing the error. Before the debugger unit or person can fully benefit this data, it needs to be stored on a storage device. In large software systems specially when running on large computer systems comprising numerous internal or external devices, numerous trace points are needed, hence, a large volume rate of error data is generated. Due to a usually fixed or limited space available for error data, most of this data is eventually overwritten by newer error information. In addition, a system slowdown caused by larger buffer sizes for saving such information can be both uneconomical and detrimental to the operation of the debugger by slowing down the system and as a result, eliminating the show up of some time-sensitive errors. On the other hand, the overwritten information can sometimes prove invaluable in debugging tasks especially when a complex software unit needs to be monitored for some longer time, by the debugger, to determine the causes of the error more precisely. Therefore, a method to store most of the error data useful for debugging over a wider time-span to eliminate the need for error recreation, while preventing system slow down, and without using possibly expensive large-capacity storage devices, is an attractive solution to the problem.

SUMMARY OF THE INVENTION

In one embodiment, it performs the following: The error logs is written at different detail levels, and having them expire at different rates. That is, the less detailed logs will be maintained longer in time, or in other words, each level of trace entry is expired at a different, tailored rate. The most detailed log, showing only the information immediately preceding the event, expires most quickly. This means that when the trace buffer is written out to some storage medium at the point of failure, the trace entries will get more frequent and detailed the closer they are in time to the point of failure. However, as we move further back in time, more of the details will be lost; while the outline history of events that would have been lost had we had an even level of tracing throughout, is maintained. Therefore, information with at least some degree of details will be available further back in time to help the diagnosis.

DETAILED DESCRIPTION OF THE PREFERRED EMBODIMENTS

Figure 1:
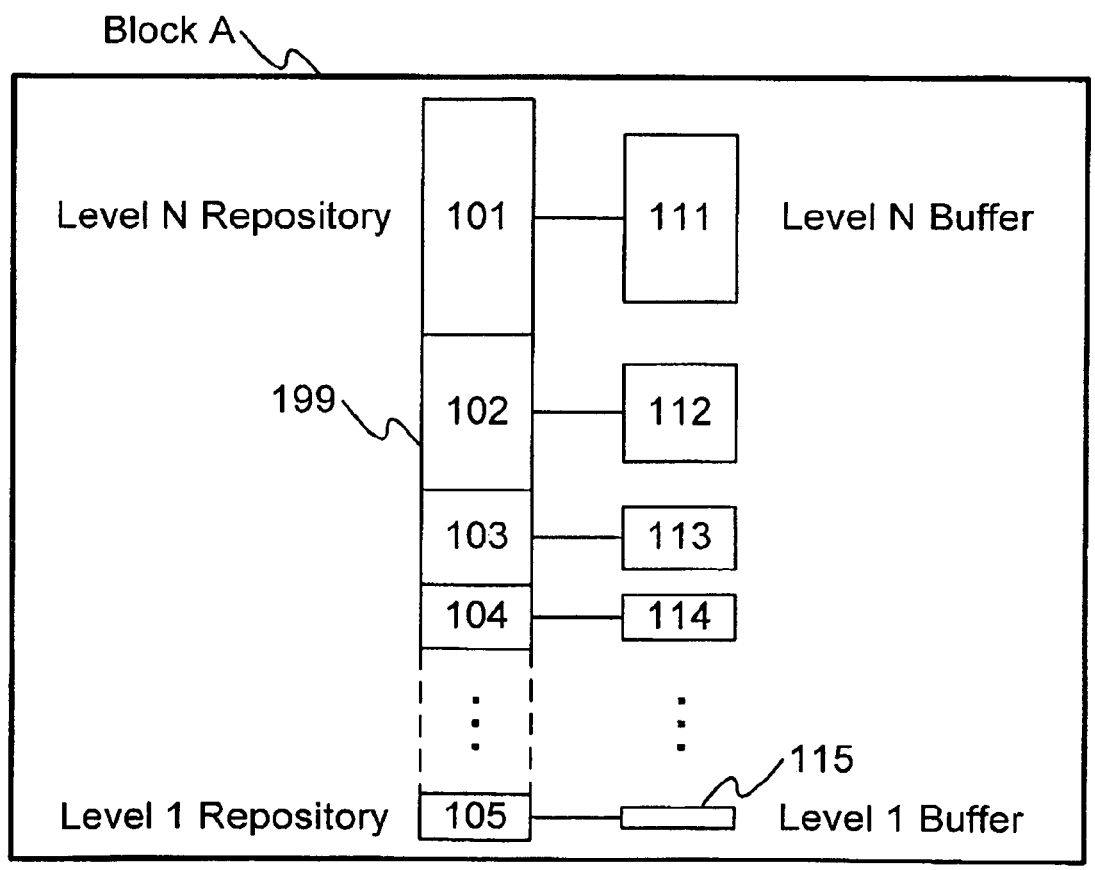
FIG. 1 shows the repositories and their different levels associated with corresponding buffers.
Figure 2:
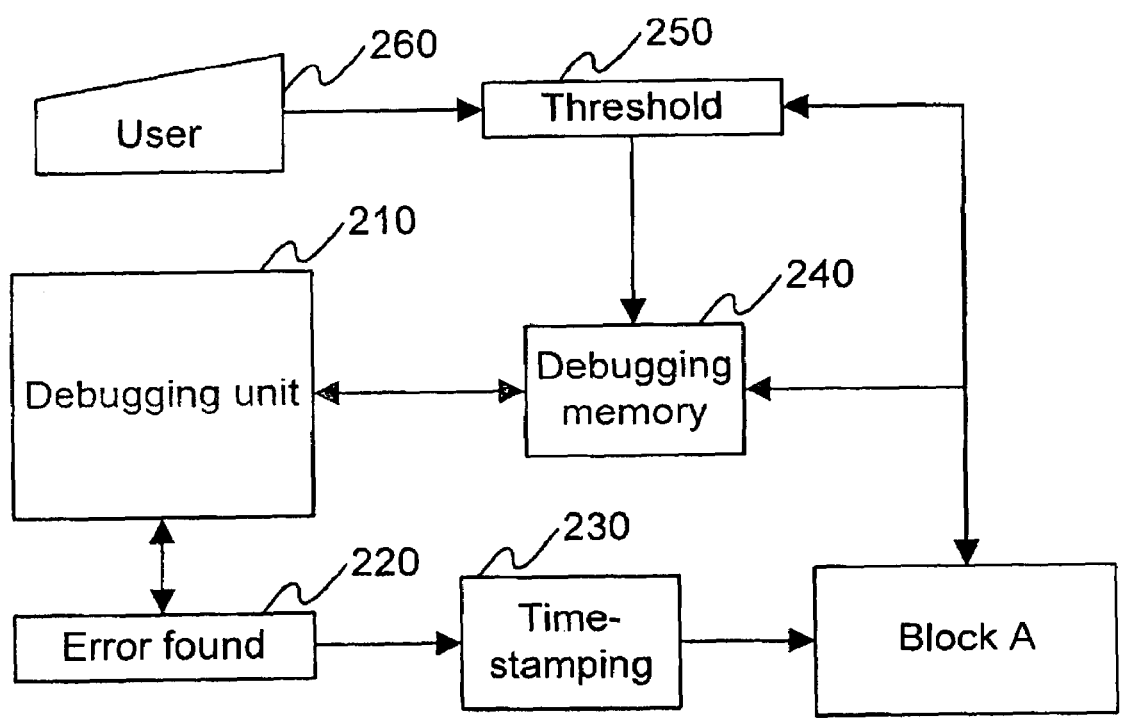
FIG. 2 is a process flow diagram of the present invention.
Figure 3:
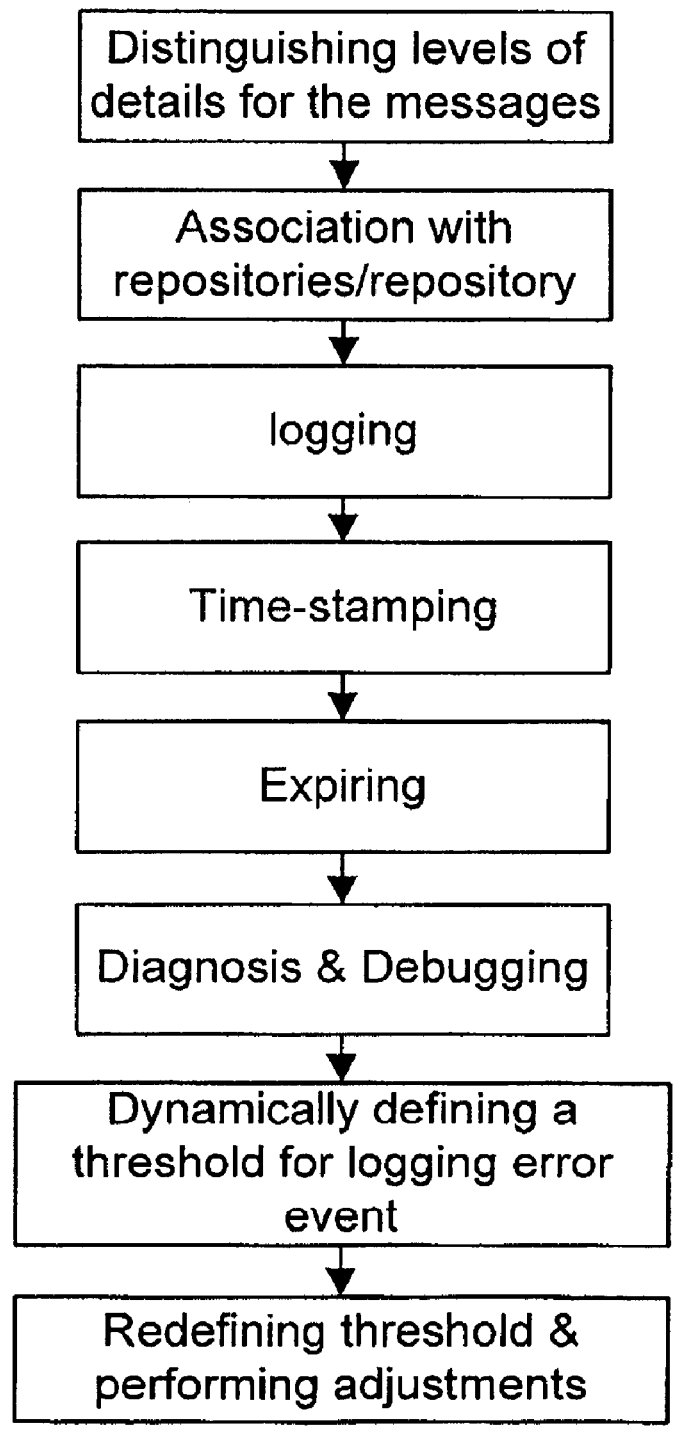
FIG. 3 is a flow chart summarizing part of the method described in claim 1.

Tracing the history of software execution is a common technique used in determining the cause of defects, and providing resolutions. In one embodiment, each event in the history is assigned a level, which may be numeric ranging from 1 to 10 for example, where level 1 may be the minimum, and level 10 the maximum. When the tracing is started, a maximum level will be selected. Although the highest possible level (in this case 10) will contain the most detailed information, and therefore should be the best level in helping to resolve any defects, there are reasons why this may not be the best choice:

the buffer which holds all the trace entries may be of restricted size and overflow or wrap more quickly at the higher levels, the performance of the system may suffer as tracing is turned on, and for timing-related defects may cause the problem to disappear.

In the first case, one can arrive at the situation where at the lowest level of detail, the trace entries do not have enough information for the problem to be resolved. Whereas at the highest level of detail, the trace buffer wraps too quickly, and data pertaining to important events in leading up to the point of interest, which is the point of failure where the defect occurred, is lost or overwritten.

Each level of trace entry is expired at a different, tailored rate. The more detailed (or higher level) a trace entry is, the quicker it is expired and removed from the trace buffer. This means that when the trace buffer is written out to some storage medium at the point of failure, the trace entries will get more frequent and detailed the closer they are in time to the point of failure. Nevertheless, as we move further back in time, we lose more of the detail; while keeping the outline history of events that would have been lost had we had an even level of tracing throughout.

Each trace level has its own buffer. The higher the level of trace entry, the smaller number of entries that buffer contains and so the faster old entries will be lost. The exact relation between level and buffer size would depend on the particular software system. When a trace is written out, each buffer is written out in turn. Each entry will have a time stamp, so the reordering of entries can be made offline at a later stage by a trace viewer, thus, not affecting the performance of the writing-out of the trace.

Instead of logging debug entries to a log-file at the point when event logging happens, the entries are stored inside a temporary buffer. Then, similar to First Failure Data Capture (FFDC), at the point of failure, the contents are written out, from the buffer into a persistent storage. FFDC, however, does not expire the old trace entries, therefore, is unable to free-up space on the temporary buffer for new trace entries. FFDC is the one already used in the WESB (WebSphere Enterprise Service Bus) product and is useful for diagnosis. However, with this method, some useful information may be lost, which is not helpful for resolving the problem. Currently, a similar method is widely used to trace defects.

It is currently possible to set the level of trace for a program, and it will typically be uniform for the whole program. Level 10 being the highest level (for example) produces the most amount of detail. The aim is to have the buffer in memory continuously receive log data, i.e. no need to reproduce the problem in order to get relevant trace data. To mention as a reminder, writing to a buffer in memory is generally faster than writing to a persistent storage.

Selecting level 10, produces the trace at level 1 through 10. Trace entries at a particular set level includes the details of the lower levels. Level 10 is extremely detailed and voluminous. The invention suggests that there is a separate buffer for each level of trace detail. The more detailed a level, the smaller time interval its buffer can cover. A small buffer means that the buffer wraps quickly and the prior detail is overwritten. Thus, when failure occurs, the detail held by buffer for level 10 will hold only the detail occurring literally before failure. The trace entries are expired with time.

Another way to implement this invention would be to output a single buffer to have a separate process go through the buffer expiring off trace entries depending on time and level.

The logs and traces that are produced when a software application is executing is essential in debugging during the software development as well as troubleshooting for a deployed software module. These logs tend to be in different levels of detail, such as Fatal, Error, Warning, Info, Trace, etc (in order of less to more level of details). Generally, the logs that are produced at a more detailed level tend to be more voluminous. In addition, when the configuration is set to produce logs at Info level, other logs at less detail such as Warning, Error, and Fatal are also produced.

As mentioned before, the problem is that when dealing with a limited buffer space for the logs, the older information in the buffer has to be overwritten with new log information. Once an event such as an Error occurs, there is a need to go back in time from the event occurrence and examine the logs/traces to see the sequence of events happening leading to the error. If the software is configured to create logs at a very detailed level, the logs will show large amount of information only just before the event occurrence, but there will be no logging information (even a less granular type) any further back in time as those have already been overwritten. On the other hand, if the software is configured to generate logs at a less detail level, there will be more logs available earlier in time relative to the event occurrence, but the more detailed level logs necessary to diagnose the problem will be absent. This is essentially a reciprocal tradeoff between the time window (time interval) for capturing the log and the level of log detail (space/time interval) for a given fixed size buffer (fixed space).

In one embodiment, it solves this balancing issue by having the logs at different detail levels expire at different rates, i.e. the less detailed logs will go back longer in time. The very detailed log expires quickly showing only the information immediately preceding the event; however, the less detailed information will be available further back in time to help the diagnosis.

In one embodiment, it achieves this objective by time-stamping the log entries and expiring the various entry types (i.e. detail level) based on various predetermined rates. For example, the voluminous Trace level entries are kept for last 1 hour while the Error level entries are kept for last 7 days.

This can be done by having separate buffers for each log at different level of detail. Given that these buffers, if they have similar buffer sizes, also tend to grow at different rates, simply expiring them (i.e. overwriting them) once the buffer size is reached will have similar effect. But in general, the space used on these buffers for each level of information can be allocated by the program.

It could also be achieved by directing the logs to the same buffer, and having a separate process scan the buffer and expire the older log entries based on both their type and their time-stamp. This can be best achieved in a database setting where the type (detail level) and timestamp are indexed columns in a log table. Here, a process can delete old entries in the log table if their time-stamp is older than a log-level dependent time interval.

In one embodiment, it is a method of debugging a software module during software development. The method comprises the steps of generating different messages (220) related to the software module. The different messages have different levels of details (198). The method distinguishes different levels of details for each of the different messages, associates different levels of details with multiple repositories (101 through 105), and associates a buffer (111 through 115) with each of the multiple repositories (101 through 105). It logs the different messages into a repository among the multiple repositories, based on their level of details, time-stamps (230) the different messages within the multiple repositories, and expires the different messages within the multiple repositories based on their level of details and their time-stamps. (Block A)

In this method, a first repository (101), which is associated with many details, expires quickly, but a second repository (105), which is associated with a small number of details, expires in a longer time. The information from the first repository (101) and the second repository (105) is used for diagnosis and debugging of the software module, dynamically defining a threshold (250) for logging an error event, and using the threshold (250) for logging the error event.

This method, if the error event occurs, traces a sequence of events from the multiple repositories (101 through 105) leading to the error, and records the sequence of events in a debugging memory (240, 210), redefines the threshold (250) for logging the error event, based on new user-configurable parameters (260). Based on the redefined threshold (250), it adjusts the recorded sequence of events in the debugging memory (240), adjusts expiration times, and adjusts buffer sizes.

A system or device/apparatus which contains one of the following is an example of this invention: a debugger module, computer or laptop, server, client computer, mobile device, a communication media, cables, fiber optics, database, printer, recording media, magnetic tape for backup, or storage device to store the traces, applying the method described above, for tracing the history of software execution.

Any variations of the above teaching are also intended to be covered by this patent application.

The invention claimed is:

1. A computer implemented method of debugging a software module during software development, said method comprising the steps of:

generating different messages related to said software module;

wherein said different messages have different levels of details;

distinguishing different levels of details for each of said different messages;

associating different levels of details with multiple repositories;

associating a buffer with each of said multiple repositories;

wherein said buffer has an initial size and an initial expiration time;

logging said different messages into a repository among said multiple repositories, based on their level of details;

time-stamping said different messages within said multiple repositories;

expiring said different messages within said multiple repositories based on their level of details and their time-stamps;

wherein a first repository among said multiple repositories is associated with a first level of details;

wherein a second repository among said multiple repositories is associated with a second level of details;

wherein said first level of details is higher than said second level of details;

wherein messages corresponding to said first repository are removed earlier than messages corresponding to said second repository;

using information from said first repository and said second repository for diagnosis and debugging of said software module;

dynamically defining a threshold for logging an error event;

using said threshold for logging said error event;

wherein if said error event occurs, tracing a sequence of events from said multiple repositories leading to said error, and recording said sequence of events in a debugging memory;

redefining said threshold for logging said error event, based on new user-configurable parameters; and based on said redefined threshold, adjusting said recorded sequence of events in said debugging memory, dynamically adjusting said expiration times, and dynamically adjusting said buffer sizes.

\* \* \* \* \*